United States Patent [19]

Guebey

[11] Patent Number: 4,805,226

[45] Date of Patent: Feb. 14, 1989

[54] IMAGE PROCESSING APPARATUS

[75] Inventor: Patrick Guebey, Parmain, France

[73] Assignee: Compagnie Generale D'Automatisme CGA-HBS, Paris, France

[21] Appl. No.: 826,054

[22] Filed: Feb. 4, 1986

[30] Foreign Application Priority Data

Feb. 6, 1985 [FR] France .............................. 85 01642

[51] Int. Cl.$^4$ .............................................. G06K 9/40
[52] U.S. Cl. ...................................... 382/27; 382/41; 382/54
[58] Field of Search ............................. 382/41, 27, 54

[56] References Cited

U.S. PATENT DOCUMENTS

| | | | |
|---|---|---|---|
| 4,003,024 | 1/1977 | Riganati | 382/49 |
| 4,034,344 | 7/1977 | Saraga | 340/146.3 |
| 4,395,699 | 7/1983 | Sternberg | 382/41 |
| 4,443,855 | 4/1984 | Bishop | 382/54 |
| 4,484,349 | 11/1984 | McCobbrey | 382/49 |
| 4,506,382 | 3/1985 | Hada | 382/41 |
| 4,646,355 | 2/1987 | Petrick | 382/54 |

OTHER PUBLICATIONS

Electronics Letters, vol. 16, No. 2, 1-17-80, pp. 51, 52, C. Arcelli et al.-"More About a Thinning Aigoritm".
Computer Vision, Graphics & Image Processing, vol. 27, No. 1, 7-84, pp. 115, 123, F. A. Gerritsen et al.-Implementation . . . Hardware.
Computer, vol. 16, No. 1, 1-83, pp. 36–47-K. Preston, "Cellular Logic Computers for Pattern Recognition".
Communications of the Association for Computing Machinery, vol. 27, No. 3, 3-84, T. Y. Zhang et al., "A Fast Parallel algorithm for Thinning Digital Patterns".

Primary Examiner—Leo H. Boudreau
Attorney, Agent, or Firm—Sughrue, Mion, Zinn, Macpeak & Seas

[57] ABSTRACT

Apparatus for processing images which have been sampled on a rectangular grid and which have been binary digitized with one bit per pixel, each pixel being considered in relation to at least some of the eight surrounding pixels in the rectangular grid. The apparatus includes a control unit (4), a random access memory (5) for storing the pixel bits, and a feedback loop connecting the image memory output to its input via at least one feedback assembly (6) comprising shift register unit (6A, 6B), a function memory (7) and a selector (8). The shift register units comprises at least one write unit (6A) and at least one read unit (6B), with the read unit being connected to the output of the image memory and being connected to supply nine bits simultaneously to the input of the function memory. The nine bits correspond to a pixel under examination and to the eight surrounding pixels, and are changed at each shift of the shift register units. The function memory provides new values for the bit of the pixel under examination on the basis of thenine bits applied to its inputs and in accordance with a plurality of predetermined criteria. The selector receives the new values from the function memory and selects one under control of the control unit. The selected on of the bits is then written back into the image memory via the write unit.

5 Claims, 3 Drawing Sheets

IMAGE PROCESSING APPARATUS

The present invention relates to apparatus for processing images sampled on a rectangular grid and binary digitized at one bit per pixel, and more particularly the present invention relates to image processing apparatus for performing skeletonization of such images.

BACKGROUND OF THE INVENTION

In numerous optical reader systems and robot vision systems, images are binary digitized prior to being processed in order to make such processing possible, and in particular, in character recognition systems the images are binary digitized prior to embarking on the recognition phase, per se.

The images are thus sampled using a grid which is generally rectangular, and each pixel which corresponds to a single grid point is binary digitized using a single bit whose value depends on whether the pixel belongs to the pattern or to the background of the image. For example, when the image is constituted by a black pattern on a white background, a one value bit may correspond to black and zero value bit may correspond to white.

When processing images, and in particular when performing character recognition, it is necessary to accurately locate special points such as nodes and the ends of lines which constitute a pattern within the image.

The large number of pixels which constitute a pattern results in a direct search for special points giving rise to a very great deal of calculation, and to results which are often inaccurate.

In order to simplify the problem of detecting special points as much as possible, and also to simplify the problem of following a pattern as such as possible, algorithms are being sought for skeletonization of binary images.

Performing such algorithms in software generally gives rise to calculation times which are incompatible with most practical applications, and in particular which are incompatible with applications operating in real time, e.g. systems for recognizing characters in mail sorting.

The present invention thus seeks to provide apparatus for processing images which have been sampled using a rectangular grid and which are digitized at one bit per pixel, said apparatus being intended to mitigate the above-specified drawbacks.

SUMMARY OF THE INVENTION

The present invention provides apparatus for processing images which have been sampled on a rectangular grid and which have been binary digitized with one bit per pixel, each pixel being considered in relation to at least some of the eight surrounding pixels in the rectangular grid, said apparatus comprising:

a control unit;

a random access memory for storing said pixel bits;

a feedback loop connecting the output of said image memory to the input thereof via at least one feedback assembly comprising shift register units, a function memory, and a selector;

said shift register units comprising at least one write unit and at least one read unit, said read unit being connected to the output of said image memory and being connected to supply nine bits simultaneously to the input of said function memory, said nine bits corresponding to a pixel under examination and to the eight surrounding pixels;

said nine bits being changed each time said control unit causes said shift register units to shift;

said function memory providing new values for the bit of the pixel under examination on the basis of the nine bits applied to its inputs and in accordance with a plurality of predetermined criteria;

said selector having a plurality of inputs connected to respective outputs from said function memory to receive said new values, with each of said inputs being individually addressable by said control unit to select one of said criteria; and said selected one of the bits determined by said function memory being written back into said image memory via said write unit which is connected to receive said new value bits from the output from said selector.

In a preferred embodiment, said pixel bits are stored in said image memory in equal length words each of which corresponds to a column or to a portion of a column in the rectangular image grid, and said read unit comprises a word receiver register having a serial output and having parallel inputs, said parallel inputs being connected to corresponding parallel outputs from said image memory, said read unit further including three identical intermediate shift registers connected in series one after the other to the output from the receiver register and each having three successive outputs connected to supply three successive bits to said function memory, said sets of three successive bits being taken from three successive columns of words occupying said transfer registers, thereby simultaneously transferring the nine bits corresponding to a pixel under examination and to its eight surrounding pixels.

BRIEF DESCRIPTION OF THE DRAWINGS

An embodiment of the invention is described by way of example with reference to the accompanying drawings, in which.

DETAILED DESCRIPTION OF THE INVENTION

Figure 1:
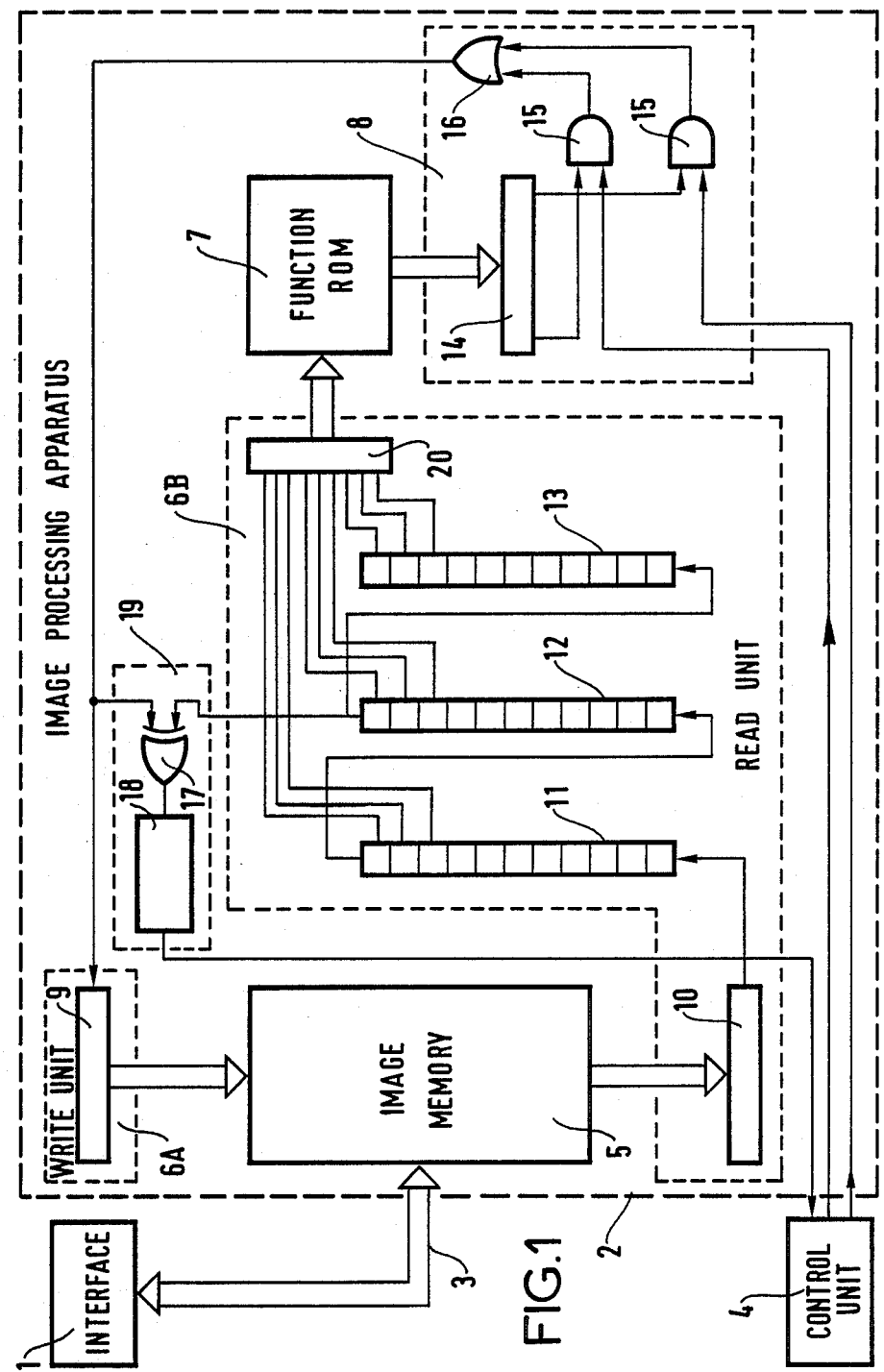
FIG. 1 is a block diagram of image processing apparatus in accordance with the invention.
Figure 2:
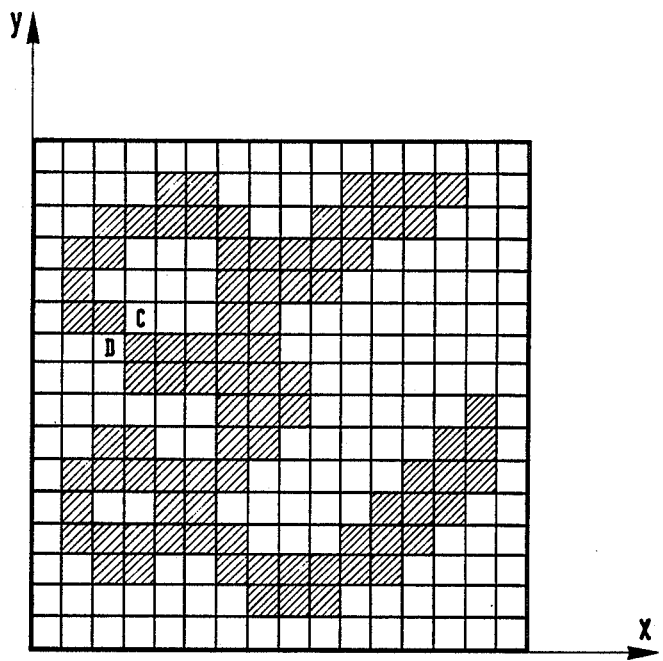
FIG. 2 is an example of a binary image.

The image processing apparatus shown in FIG. 1 is intended to process images which are sampled using a rectangular grid. An example of such an image is shown in FIG. 2.

Each pixel corresponding to a single grid point is encoded in binary form by means of a single bit depending on whether the cell belongs to the background or the pattern of the image, i.e. the code bit is representative of the color of the pixel. In the example shown, a binary value A is given to bits corresponding to black pattern pixels and a binary value B (for background) is given to bits corresponding to white background pixels, and conventionally the binary value A is one, and B is zero.

The pixels in the grid are conventionally identified relative to two rectangular co-ordinates enabling the image to be stored in memory as a succession of words of equal length. In the example shown, each word has a length n equal to eight bits and the grid is designed to process images built up from p columns of m words each, and in the specific case of FIG. 2, m is equal to two.

A conventional specialized interface 1 (see FIG. 1) is provided to supply the image processing apparatus 2 with words representative of the image to be processed. The specialized interface 1 is not described in detail here since it has no direct bearing on the present invention. It may comprise, for example, an optical reader associated with a digital encoder and/or with digital data storage means. It is connected to the image processing apparatus 2 by means of a two-way connection 3.

A control unit 4 comprises a processor and a clock (not shown) for ensuring proper operation of the assembly constituted by the specialized interface 1 and the image processing apparatus 2 in a conventional manner by sending clock signals and instructions and by analyzing data received in return. These techniques are conventional and are not described in greater detail herein.

Digital data are exchanged between the specialized interface 1 and the image-processing apparatus 2 over the two-way link 3 and are stored in a random access memory (RAM) referred to as the image memory 5. This memory 5 is suitable for containing words relating to at least one image and compatible with the rectangular grid used.

In the embodiment shown, the image memory 5 is addressed on a word-by-word basis, with each word being individually addressable for writing or for reading.

A feedback loop is provided around the image memory 5 by means of an assembly 6 comprising shift register units, a read only function memory 7, and a selector 8.

The assembly 6 is divided into at least one write unit 6A and at least one read unit 6B which are respectively connected to the input and to the output from the image memory 5.

The write unit 6A comprises at least one transfer shift register 9 having a serial input connected to the output of the selector 8 and having parallel outputs connected to a corresponding number of inputs to the image memory 5, said register 9 having a capacity of at least one word. There may be more than one transfer register 9 in order to allow parallel processing of image pixels, in which case the outputs from said registers are connected in parallel or are multiplexed to the inputs of the image memory depending on whether the memory is suitable for storing one or more words at each address.

The read unit 6B includes at least one receiver shift register 10, which register has a capacity of at least one word and has parallel inputs connected to parallel outputs from the image memory 5 to receive at least as many bits as there are bits to a word.

There are the same number of receiver registers 10 as there are transfer registers 9, and there may therefore be more than one receiver register in order to allow for parallel processing of the image pixels, in which case the inputs having the same bit positions to the receiver registers 10 are connected in parallel to the outputs from the image memory, and are optionally connected via a deselector (not shown) so that time-division multiplexing can be used to allow words from the transfer registers 9 to be inserted into the image memory and words from the image memory to be selectively inserted into the receiver registers 10, under the control of the control unit 4 using conventional techniques.

Each receiver register 10 has a serial output feeding a respective sequence of three intermediate registers 11, 12, 13 which are connected in series with one another, with each intermediate register being suitable for storing at least one word. In the embodiment shown, the three intermediate registers 11, 12 and 13 are likewise shift registers and they are identical. Their capacity is $m \times n$ bits, i.e. sixteen bits in this case, and the last three stages of each of them have their individual outputs connected to address inputs of the function memory 7.

Each 9-bit address provided by the intermediate registers 11, 12, and 13 thus selects a q-bit word in the function memory 7 which is suitably programmed to provide different output words depending on the selected address. The various bits of each output word relate to different specified functions being performed on the set of nine input bits.

The outputs from the function memory 7 supply the selector 8 with words via a buffer register 14 of the parallel/parallel type, and the output bits from the buffer register 14 are connected to first inputs of a corresponding number of AND gates 15 whose outputs are connected to an OR gate 16. The AND gates 15 have their second inputs connected to the control unit 4, whereby one of said AND gates 15 is selectively activated, depending on which function is being performed.

The output from the gate 16 constitutes the output from the selector 8 and is connected firstly to the input of the write unit 6A and secondly to one input of an exclusive-OR gate 17 whose other input is connected to the last stage of the intermediate register 12. The output from the gate 17 activates a counter 18 which, together with said gate 17, constitutes a modification detector circuit 19 whose output signals are supplied from the counter 18 to the control unit 4, optionally via a temporary buffer register (not shown).

In order to process an image, and in particular to perform skeletonization thereof, i.e. to remove excess pixels from the pattern without modifying pattern connectivity, various topological constraints must be complied with. In particular, in some applications, it is essential to avoid excessively reducing the lengths of the strokes from which a pattern is built up and to avoid making gaps, for example, closed loops in the original image should not be opened up by accident.

Thus, for example, sampling an image using a rectangular grid may lead to aberrations such as shown in FIG. 2 in the vicinity of pixels referenced C and D. In this figure, it is obvious that background pixel C is separated from background pixel D by the pattern in the original, non-digitized image. However, if the same argument for determining connectivity is applied to the black pattern pixels as is applied to the white background pixels, then it becomes obvious that background pixels C and D are contiguous. This would then lead to considering a single pixel as being simultaneously inside and outside a loop in the pattern, and the resulting attempt at skeletonization would be indeterminate.

In order to avoid this difficulty, it is necessary to consider two orders of connectivity, one of which is applicable to pattern pixels of binary value A, and the other of which is applicable to background pixels of binary value B.

Two pattern pixels are thus considered to be contiguous when their connectivity D1 as defined by a first equation is equal to unity:

$$D1(P1,P2) = \text{Sup}(|x1-x2|,|y1-y2|) = 1$$

where P1 and P2 are the pixels under consideration which are considered as being points having co-ordinates (x1,y1) and (x2,y2) respectively along the rectangular reference axes of the grid. Sup(a,b) means take the greater of the two values a and b, and in the present case the expression means the greater of the two absolute differences $|x1-x2|$ and $|y1-y2|$.

However, two background pixels are considered to be contiguous when their connectivity D2 as defined by a second equation is equal to unity:

$$D2(P1,P2) = |x1-x2| + |y1-y2| = 1.$$

Figure 3:
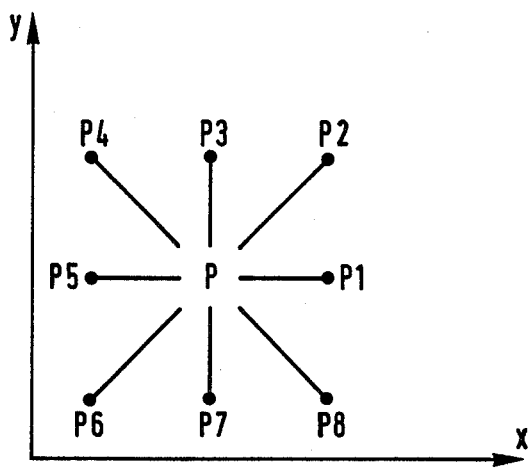
FIG. 3 is a diagram showing the structure of a matrix of pixels.

Thus, if eight pixels around a ninth pixel under examination are investigated for contiguity therewith in a three-by-three sub-matrix of the rectangular grid, as shown in FIG. 3, then all eight pixels P1 to P8 are contiguous with the center pixel P according to connectivity D1, whereas only the pixels P1, P3, P5, and P7 are considered as being contiguous according to connectivity D2.

Thus, two pattern pixels are considered as being contiguous if there exists a path d1 between them in accordance with the first connectivity equation D1, and in contrast two background pixels are considered as being contiguous if there exists a path d2 between them in accordance with the second connectivity equation D2.

This makes it possible to modify a binary digitized image without creating gaps which were not already present in the original image.

All of the pattern pixels which are at a distance d1 from at least one other pattern pixel belong to a common "island" in the pattern and constitute a class; any image having a pattern constitutes a collection of one or more pattern classes, for example one or more characters, together with one or more background classes which correspond to respective "islands" of background, and these classes are used to define the order of connectivity of the image for the pattern and for the background. No discontinuities are created in an image by eliminating excess pixels from the pattern provided that the eliminated pattern pixels do not cause the orders of connectivity of the modified image (pattern and background orders) to change relative to the orders of connectivity of the original image.

An additional condition is added with the same general purpose, and serving to avoid excessively reducing the length of free strokes in the pattern by requiring a third equation to be complied with whereby pixels for which:

Card N*P = 1 are to be retained, where P is the pattern pixel under examination and where Card N*P corresponds to the number of paths d1 connecting said pixel to other contiguous pixels of the pattern.

In a preferred embodiment of the invention, the image is processed by a succession of four phases (which may be repeated), during each of which phases the values of pattern pixel bits which are considered to be superfluous are given the background binary value.

To this end, each pixel of the pattern is considered relative to the eight surrounding pixels in the rectangular grid, with pixels on the edges of the grid being taken to be adjacent to a margin of background pixels for the purpose of analysis, should the pattern extend as far as the edge of the grid.

The purpose of each phase is to determine whether a pattern pixel taken from a determined set of pattern pixels is a necessary pixel or a superfluous pixel.

To this end, four disjoint sets E1, E2, E3, and E4 are considered taking into account the pixels adjacent to all four sides of the pattern pixel but having one co-ordinate equal to one or other of the co-ordinates of the pattern pixel under consideration, i.e. pixels P1, P3, P5, and P7 for pixel P in FIG. 3.

Each phase thus consists in determining whether the pattern pixels belonging to a given set are necessary or superflous, with the first set E1 comprising, for example, all the pixels of the pattern (i.e. having logical value A) having a background pixel (i.e. a cell of logic value B) immediately thereabove (i.e. in position P3), with the second set E2 comprising, for example, all pattern pixels not belonging to the set E1 and having a background pixel immediately therebelow (P7). The third E3 comprises all pattern pixels not belonging to either of the preceding sets and having a background pixel immediately to the right (P1), and the last set E4 comprises all pattern pixels which do not belong to any of the three preceding sets and which have a background pixel immediately to the left (P5).

This serves to successively eliminate superfluous pattern pixels from each of the four margins of the pattern in the grid directions. It may thus be necessary to repeat the process several times if skeletonization is not obtained after a single four-phase pass by virtue of the thickness of the pattern lines. The sets of pixels taken into consideration during each pass are thus different even though they respond to the criteria specified above for the E1 to E4.

The desired skeletonization is obtained when the final image is no longer modifiable by applying the chosen selection procedure.

As indicated above, each pattern pixel is taken into account when under examination with reference to at least some of the eight surrounding pixels in the three-by-three matrix centered on said pixel.

Under the above-specified skeletonization conditions, there are sixteen distinct configurations summarizing the various cases when a pattern pixel situated on the margin of the pattern is considered as being superfluous, with these sixteen configurations being obtained by 90° rotations about the central cell from the four configurations marked below:

| X A X | B B B | X B B | B B B |
| A P B | B P B | A P B | B P B |
| X A X | X A A | X A X | A A X | where P is the pattern pixel under examination (and thus of binary value A), where X is a pattern pixel or a background pixel whose value is irrelevant at the current stage, i.e. is irrelevant for determining whether the pixel under examination is superfluous or not, and where A and B are the pattern and background binary values, respectively.

It is also possible to determine the existence of line ends and nodes in the pattern while examining pixels of the pattern by determining the value of the expression Card N*(P) which defines the number of pattern pixels adjacent to the pixel under examination, given that this value is equal to one for an end and is greater than two for a node, where Card is the cardinal number of the set constituted by logic value A pixels to be found amongst the eight pixels surrounding the pixel under examination.

In the embodiment shown, the function memory 7 receives a nine-bit binary word built up from the binary values of a pixel under examination and of the eight pixels which surround said pixel under examination, and if the pixel under examination is of value A, the function memory examines whether it is necessary or superfluous as a function of the above-specified configurations so as to supply an output bit of value A if the pixel is necessary or to modify its initial binary value A to binary value B if it corresponds to a configuration which can be considered as superfluous under the selected criteria.

Naturally, the function memory 7 makes it possible to examine a pixel under examination relative to any given configuration of the eight surrounding pixels, and said given configuration may be different from those mentioned above; indeed, each nine-bit address may give rise to a special result.

In the embodiment described, the control unit 4 may be used to select output signals from one or other of at least four outputs from the function memory, with each output corresponding to one of the four phases mentioned above.

Operation of the apparatus in accordance with the invention is now described with reference to the simplified diagram of FIG. 4.

This diagram represents the contents of the image memory 5 and of the shift registers 9 to 13 symbolically by shading squares in said memory and said registers, and it also shows the function memory 7 and the selector 8 constituting parts of the feedback loop.

Figure 4:
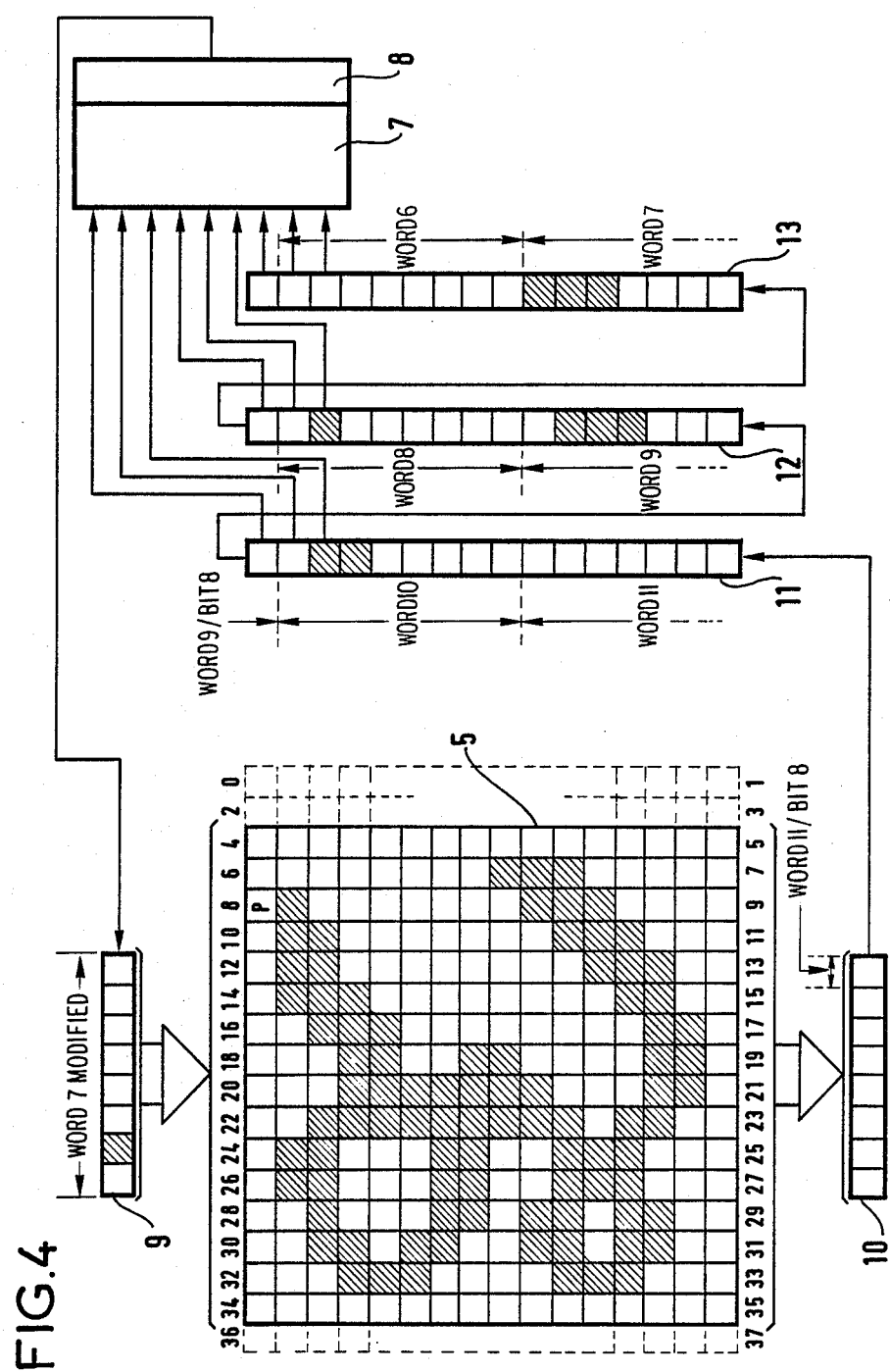
FIG. 4 is a diagram showing the operation of apparatus in accordance with the invention.

Initially, a binary digitized image, such as the image shown in FIG. 4, is loaded into the image memory 5. The eight-bit words which are used in pairs to build up the columns of the rectangular grid are loaded one-by-one into the receiver register 10 which transmits them bit-by-bit to the input of the first intermediate register 11, with the words being loaded one-by-one into the receiver register 10 in a conventional manner once during each set of eight bit-shifting clock pulses, and with the control unit 4 (FIG. 1) providing the appropriate control signals.

As mentioned above, the number of stages in the intermediate registers is established so that the outputs from the last three stages of each intermediate register supply the nine address bits corresponding to one pixel under examination and eight adjacent pixels, with the pixel under examination being represented by the bit in the last stage but one in the middle intermediate register 12.

Thus, each time the various registers shift and during examination of the pixel situated in the last stage but one of the intermediate register 12, the function memory 7 provides output signals which are selectable by the control unit 4 by means of the selector 8. In the skeletonization technique proposed, a signal of binary value A or B is provided at the input of the transfer register 9 for each pixel under examination, depending on whether said pixel is considered as being necessary or superfluous.

The example shown in FIG. 4 shows the system in a state in which the pixel under examination is the top pixel of half-column 8, with the pixels of the preceding half-columns having already been examined, and in particular with half-columns 6 and 7 having already been examined, whose corresponding words are in the last intermediate register 13 for the most part (all eight bits of word 6 and the first seven bits of word 7 are in register 13, and the last bit of word 7 is in the middle intermediate register 12).

Thus, the white background pixel is translated by the function memory 7 into a background pixel, providing the process being applied is the above-defined skeletonization process, and as a result of the selector 8 supplies a bit of binary value B, whereas the first value A bit in word 7 which corresponds to the top pixel of half-column 7 was converted into a value B bit as can be seen by observing the contents of the transfer register 9 where, after shifting, a word 7 as modified after examination is stored for writing in parallel into the image memory 5. In particular, the new word 7 will occupy the location previously occupied by the old word 7 and the new word 7 has only one bit of value A corresponding to a single pattern pixel whereas the old word 7 had three adjacent bits of value A.

All of the words corresponding to the different half-columns are successively examined, and the counter 18 stores the number of modified bits by summing changes indicated by exclusive-ORing the bit contained in the last stage of the middle intermediate register 12 and with the corresponding bit which is output from the selector 8 at the same time, between two shift pulses.

Skeletonization continues until the counter has recorded no change after a four-phase pass, (although it would naturally be possible to reduce the time required for skeletonization by paralleling access to the function memory 7 and/or paralleling access to the image memory 5).

In the example shown in FIG. 4, it should also be observed that the words 9, 10, and 11 are shifted one after the other through the intermediate registers 12 and 11 prior to being examined, with the last bit of word 11 still being in the last stage of the receiver register 10 which is about to receive word 12 corresponding to half-column 12 once the last bit of word 11 has been shifted out.

I claim:

1. Apparatus for processing images which have been sampled on a rectangular grid and which have been binary digitized with one bit per pixel, each pixel being surrounded by eight surrounding pixels and being considered in relation to at least some of the eight surrounding pixels in the rectangular grid, said apparatus comprising:

a control unit;

a random access image memory for storing said pixel bits;

a feedback loop connecting the output of said image memory to the input thereof via at least one feedback assembly comprising shift register units which shift under control of said control unit, a function memory, and a selector;

said shift register units comprising at least one write unit and at least one read unit, said read unit being connected to the output of said image memory and being connected to supply nine bits simultaneously to the input of said function memory, said nine bits corresponding to a pixel under examination and to the eight surrounding pixels;

said nine bits being changed each time said control unit causes said shift register units to shift;

said function memory simultaneously providing a plurality of new value bits for the bit of the pixel under examination, each of said plurality of new value bits being generated on the basis of the nine bits applied to its inputs and in accordance with a respective one of a plurality of predetermined criteria;

said selector having a plurality of inputs connected to respective outputs from said function memory to receive said new value bits, with each of said inputs being individually addressable by said control unit to select one of said new value bits as a selector output independently of the value of the bit representing the pixel under examination; and said selected one of the new value bits determined by said function memory being written back into said image memory said selected one of the new value bits determined by said function memory being written back into said image memory via said write unit which is connected to receive said new value bits from the output from said selector.

2. Apparatus according to claim 1, wherein said pixel bits are stored in said image memory in equal length words each of which corresponds to a column or to a portion of a column in the rectangular image grid, and said read unit comprises a word receiver register having a serial output and having parallel inputs, said parallel inputs being connected to corresponding parallel outputs from said image memory, said read unit further including three identical intermediate shift registers connected in series one after the other to the output from the receiver register and each having three successive outputs connected to supply three successive bits to said function memory, said sets of three successive bits being taken from three successive columns of words occupying said transfer registers, thereby simultaneously transferring nine bits, said nine bits corresponding to a pixel under examination and to its eight surrounding pixels.

3. Apparatus according to claim 2, including a modification detector connected firstly to the output from said selector and secondly to the second of the three outputs from the second intermediate register in order to compare the value of the bits corresponding to the pixel under examination with the new value attributed to said bit by said function memory via said selector.

4. Apparatus according to claim 1, including a modification detector means for comparing the bit representing the pixel under examination with the new value bit provided from said selector output, said apparatus repeatedly processing an image containing said pixel until said comparing means detects no change in value between said bit representing the pixel under examination and the new value bit provided from said selector output.

5. Apparatus for processing images which have been sampled on a rectangular grid and which have been binary digitized with one bit per pixel, each pixel being surrounded by eight surrounding pixels and being considered in relation to a predetermined number of the eight surrounding pixels in the rectangular grid, said apparatus comprising:

means for providing input bits representing a pixel under examination and said predetermined number of the eight surrounding pixels;

means for receiving said inputs bits and for simultaneously providing a plurality of new value bits for the bit of the pixel under examination, each of said plurality of new value bits being generated on the basis of the value of the bit representing the pixel under examination and the bits representing said predetermined number of the eight surrounding pixels and each of said plurality of new value bits being generated in accordance with a respective one of a plurality of predetermined criteria; and selector means having a plurality of inputs connected to respective outputs from said means for receiving, to receive each of said new value bits, said selector means selecting as an output one of said plurality of new value bits as a selector output independently of the value of the bit representing the pixel under examination.

* * * * *